(12) United States Patent
Ono

(10) Patent No.: US 6,308,423 B1
(45) Date of Patent: Oct. 30, 2001

(54) CUTTING TOOL WITH AN IMPROVED GUIDE REPOSITIONING STRUCTURE

(75) Inventor: Masahiko Ono, Okazaki (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/352,573

(22) Filed: Jul. 13, 1999

(30) Foreign Application Priority Data

Jul. 15, 1998 (JP) ................................................. 10-200801

(51) Int. Cl.$^7$ .................................................. B27B 11/02
(52) U.S. Cl. .................................. 30/377; 30/374; 30/392
(58) Field of Search ............................. 30/371, 374, 375, 30/377, 392, 393, 394

(56) References Cited

U.S. PATENT DOCUMENTS 5,007,172 * 4/1991 Palm ....................................... 30/377
5,421,091 * 6/1995 Gerritsen, Jr. ......................... 30/377

FOREIGN PATENT DOCUMENTS 6-31916   4/1994  (JP) .

* cited by examiner

Primary Examiner—Hwei-Siu Payer
(74) Attorney, Agent, or Firm—Foley, Hoag & Eliot, LLP

(57) ABSTRACT

A reciprocating saw includes a hexagonal head bolt (11) for releasably tightening a guide shoe (6) and a manually-operated bolt-tightening lever (15) fitted over the bolt (11). The bolt-tightening lever (15) includes a lock plate (17) which has at its front end a socket hole (22) that can fit around the head (14) of the hexagonal head bolt (11) and has a serrated edge with twelve notches each having an interior angle of 120 degrees. The lock plate (17) has at its rear end four engaging teeth (23) at intervals of four degrees around axis O of the hexagonal head bolt (11). The shape of the outer portion (18) is such that the outer portion can cover the lock plate (17). Moreover, the outer portion (18) has on its top side a circular hole (24) in which the head (14) of the bolt (11) can be fitted. The outer portion (18) includes also on its top side a compensation recess (25) in which the lock plate (17) is set and can pivot sixteen degrees in either direction about the axis O from the position in which the lock plate (17) is aligned with the outer portion (18). Formed at the rear end of the compensation recess (25) are a plurality of compensation teeth (26) that can mesh with the engaging teeth (23). The compensation teeth (26) span the 32 degree range in which the lock plate (17) pivots in the outer portion (18).

17 Claims, 4 Drawing Sheets

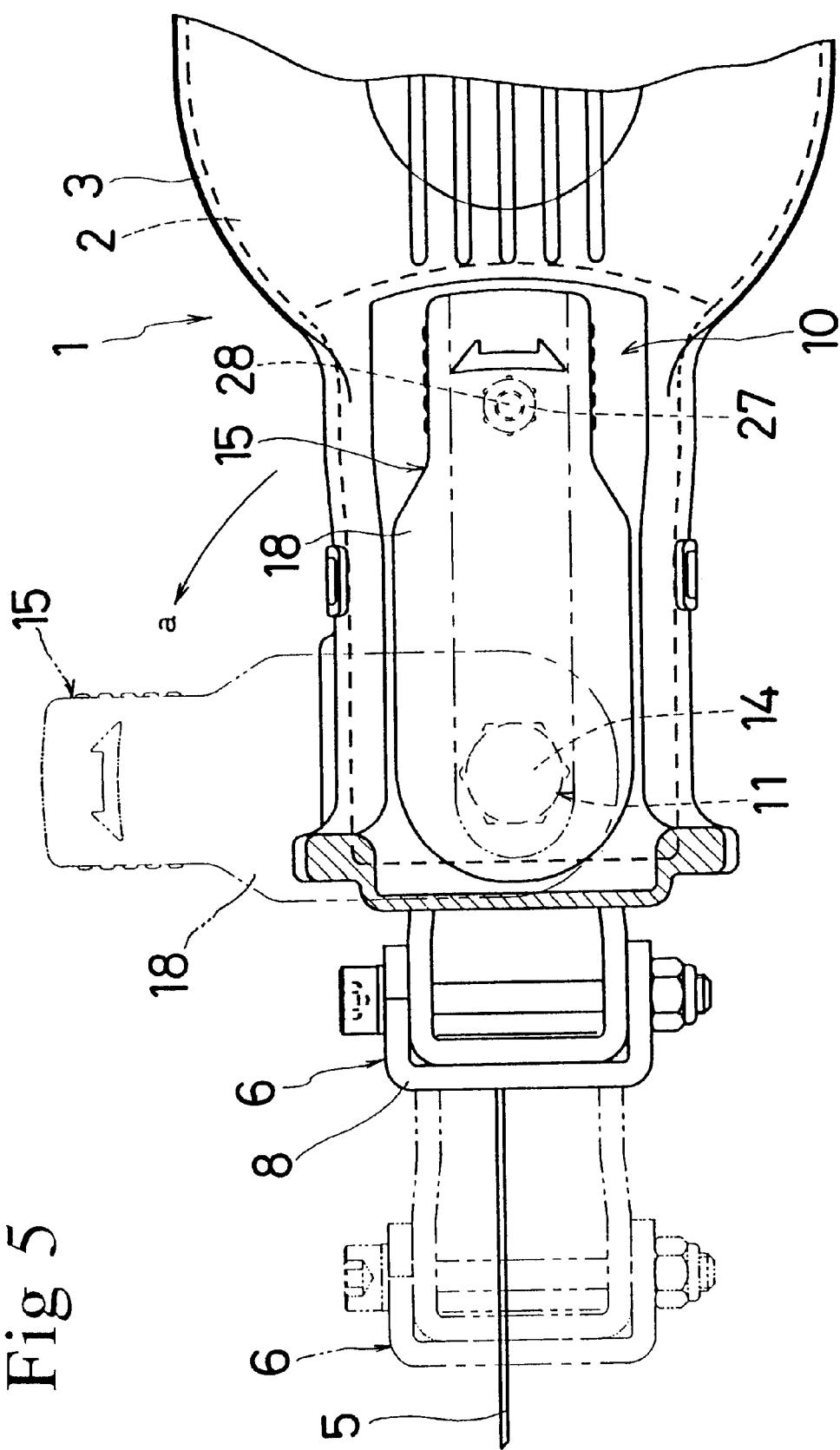

CUTTING TOOL WITH AN IMPROVED GUIDE REPOSITIONING STRUCTURE

This application claims priority on Japanese Patent Application No. 10-200801, the contents of which are incorporated herein by reference.

BACKGROUND OF THE INVENTION

1. Field of the Invention

The present invention relates to cutting tools, such as reciprocating saws. More particularly, the present invention relates to a reciprocating saw having a guide member coupled to a main housing for use in cutting workpieces.

2. Description of the Related Art

Cutting tools, such as reciprocating saws, commonly includes in front of a main housing a guide shoe or other guide member which is pressed against a workpiece during operation. The guide member is coupled to a slide shaft which is slidably provided in the main housing and is oriented parallel to the blade of the reciprocating saw. The blade commonly protrudes from the front end of the main housing. The slide shaft is secured to the main housing by a screw, such as a hexagon head bolt. To fix the guide member in a desired slide position with respect to the main housing, the hexagon head bolt is first loosened and the slide shaft is pulled out or retracted to the desired position. The hexagon head bolt is then tightened again to secure the slide shaft to the main housing, thus fixing the guide member in the desired position.

Conventional reciprocating saws require a tool, such as a hexagonal wrench in order to tighten and loosen the bolt. To overcome this inconvenience, the applicant proposed in Japan Published Unexamined Utility Model Application No. 6-31916 a structure for permitting the position of the guide member to be adjusted without the use of any tool. In this structure, a manually-operated lever attached to the hexagon head bolt is rotated to tighten and loosen the bolt so as to adjust the position of the slide shaft and thus the guide member with respect to the main housing.

In the foregoing structure, however, if the lever protrudes at an angle from the main housing, the operator may have difficulty maintaining a secure hold on the main housing. Therefore, care must be taken during assembly of the tool at the plant to fit the manually-operated lever in an accommodating recess formed in the housing when the hexagon head bolt, is properly tightened to secure the slide shaft to the housing. As can be imagined, it is a troublesome and difficult task to coordinate the tightening rotation of the hexagon head bolt with the angle of the lever so that the lever is conveniently accommodated in the recess when the bolt is properly torqued.

SUMMARY OF THE INVENTION

In view of the above-identified problems, an important object of the present invention is to provide a cutting tool which permits a manually-operated lever to be easily and accurately assembled to the slide shaft so that the lever is rotated to an unobstructive position when the screw or bolt for fixing the slide shaft is properly tightened.

Another object of the present invention is to provide a cutting tool the guide shoe of which can be easily repositioned without obstructing or interfering with the operator's handling of the tool.

The above objects and other related objects are realized by the invention, which provides a cutting tool including: a housing; a guide member slidably attached to the housing; a screw member having an axis for securing the guide member in a desired position; a screw-tightening lever for rotating the screw member to secure the guide member; and a receiving portion for accommodating the screw-tightening lever at a rotational position of the screw member where the screw member secures the guide member. In this cutting tool, the screw-tightening lever includes an internal lever which is connected to the screw member and an outer lever attached to the screw member so as to pivot with the screw member on the axis of the screw member. The screw-tightening lever further includes a coupling means for connecting the internal lever to the outer lever in the receiving portion within a predetermined range of deviation from a predetermined position so that the outer lever remains within a predetermined range of positions within the receiving portion at said rotational position of the screw member.

According to one aspect of the present invention, the screw member is a bolt having a head and the internal lever is connected to the bolt by fitting the head of the bolt into a polygonal socket hole formed in the internal lever so that the internal lever is pivotal on the bolt head and the pivotal position of the internal lever with respect to the bolt head is changeable by a plurality of predetermined units of angle corresponding to the angle of the corners of the polygonal socket hole. Additionally, the coupling means of the screw-tightening lever comprises a plurality of compensation teeth formed on the outer lever and a plurality of engaging teeth formed on the internal lever so as to engage the compensation teeth within a range of pivotal positions no less than the predetermined unit of pivotal angle of the internal lever with respect to the bolt head.

According to another aspect of the present invention, the internal lever is shaped substantially symmetrically about a longitudinal center line which extends substantially parallel to the guide member, the outer lever is shaped substantially symmetrically about a longitudinal center line which extends substantially parallel to the guide member, and the two center lines pass through the axis of the screw member. In the cutting tool according to the invention, the deviation of the internal lever from the predetermined position may be that caused by pivoting of the longitudinal center line of the internal lever from that of the outer lever.

According to still another aspect of the present invention, the bolt is a hexagonal head bolt and the angle of each corner of the polygonal hole in the internal lever is approximately 120 degrees, so that the predetermined unit of pivotal angle is approximately 30 degrees. Moreover, the compensation teeth and the engaging teeth may be located along a common circumference with the axis of the hexagonal head bolt as the center and the internal lever is formed with four engaging teeth at intervals of four degrees around the axis of the hexagonal head bolt, thus spanning a sixteen degree range, with the center line of the inner lever symmetrically dividing the four engaging teeth into two on each side of the line, and the compensation teeth are formed at intervals of four degrees around the axis of the hexagonal head bolt, with the center line of the outer lever symmetrically dividing the compensation teeth into approximately equal numbers of teeth on either side of the line, so as to allow the internal lever to have plurality of pivotal positions of at least a 30 degree range.

According to yet another aspect of the present invention, the screw-tightening lever further includes a means for maintaining engagement between the internal lever and the outer lever.

In accordance with another aspect of the present invention, the means for maintaining engagement includes a connection plate which has a circular hole at a first end thereof for being fitted around the hexagonal head bolt and a slot at a second end thereof. The means for maintaining engagement further includes a screw means for being tightened into the outer lever through the slot of the connection plate, with the internal lever interposed between the outer lever and the connection plate.

In one practice, the receiving portion is a recess provided in the housing of the tool and configured so that the screw-tightening lever is located in an unobstructive position for manual handling when accommodating the screw-tightening lever.

In another practice, the outer lever further includes a recess for accommodating the head of the hexagonal head bolt, the inner lever, and the means for maintaining engagement.

To carry out the invention in one preferred mode, the guide member is a guide shoe which includes a shaft portion having a first end slidably inserted in the housing and a second end protruding from a front end of the housing, and a plate portion attached to the second end of the slide shaft for being pressed against workpieces.

In one embodiment, the guide member further includes a slot formed in the shaft, portion, and the screw member is tightened into the housing via the slot so as to secure the guide member in a desired position along the slot with respect to the housing.

Other general and more specific objects of the invention will in part be obvious and will in part be evident from the drawings and descriptions which follow.

BRIEF DESCRIPTION OF THE ATTACHED DRAWINGS

For a fuller understanding of the nature and objects of the present invention, reference should be made to the following detailed description and the accompanying drawings, in which:

FIGS. 2A–2C show major components of a bolt-tightening lever of the reciprocating saw shown in FIG. 1, in which FIG. 2A shows an inner plate of the bolt-tightening lever; FIG. 2B shows a lock plate of the bolt-tightening lever; and FIG. 2C shows an outer portion of the bolt-tightening lever;

FIG. 5 shows the manner in which the bolt-tightening lever is operated to change the position of a guide shoe of the reciprocating saw shown in FIG. 1.

DETAILED DESCRIPTION OF THE PREFERRED EMBODIMENT

A preferred embodiment according to the present invention will be described hereinafter with reference to the attached drawings.

Figure 1:
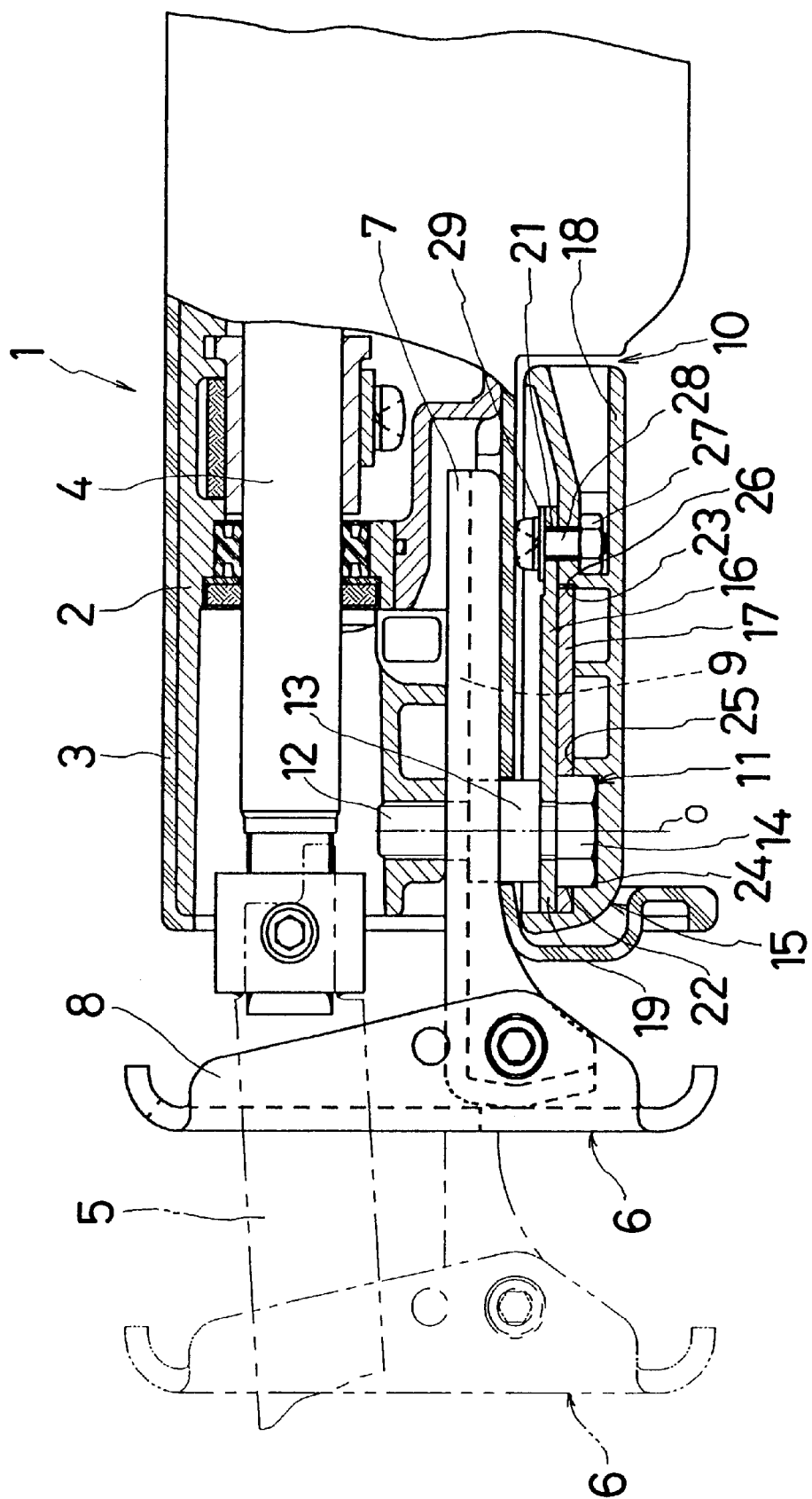
FIG. 1 is a partially cross-sectional view of a top portion of a reciprocating saw which embodies the present invention.

FIG. 1 is a partial cross section of a top portion of a reciprocating saw 1 which embodies the present invention. The reciprocating saw 1 includes a main housing 2 which is covered with a rubber casing 3. A motor-driven reciprocating slider 4 is disposed within the main housing 2. A blade 5 is coupled to the top end (to the left in the FIG) of the slider 4. Furthermore, a reciprocating saw 1 includes at its top end a guide member, such as a guide shoe 6, which is attached to the main housing 2 by means of a hexagon head bolt 11 (described in detail below). The guide shoe 6 in turn includes a slide shaft 7 and a shoe plate 8. The slide shaft 7 is oriented parallel to the slider 4 and is slidably accommodated in the main housing 2. The shoe plate 8 is connected to the top end of the slide shaft 7 and is penetrated by the blade 5. An elongated slot 9 is formed along the longitudinal center line of the slide shaft 7 in parallel with the slider 4.

At the underside of the main housing 2 is formed a lever accommodating recess 10. The hexagonal head bolt 11 has a head 14 at one end and an externally threaded portion 12 at the other, top end which is inserted into the main housing 2 at the front end of the accommodating recess 10 through a sleeve 13 and the elongated slot 9 of the slide shaft 7. By tightening of the hexagonal head bolt 11, the sleeve 13 presses the slide shaft 7 against the main housing 2, thereby securing the guide shoe 6 to the housing at a desired position.

Figure 2A:
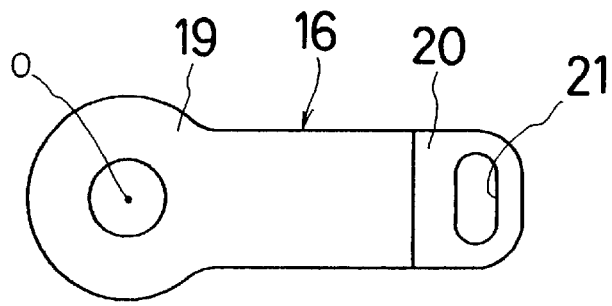
Figure 2:
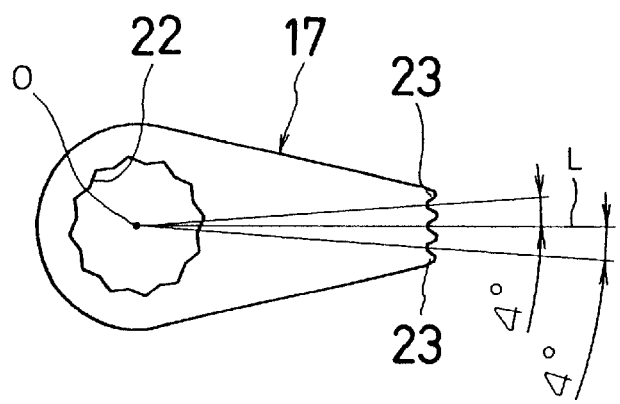
Figure 2C:
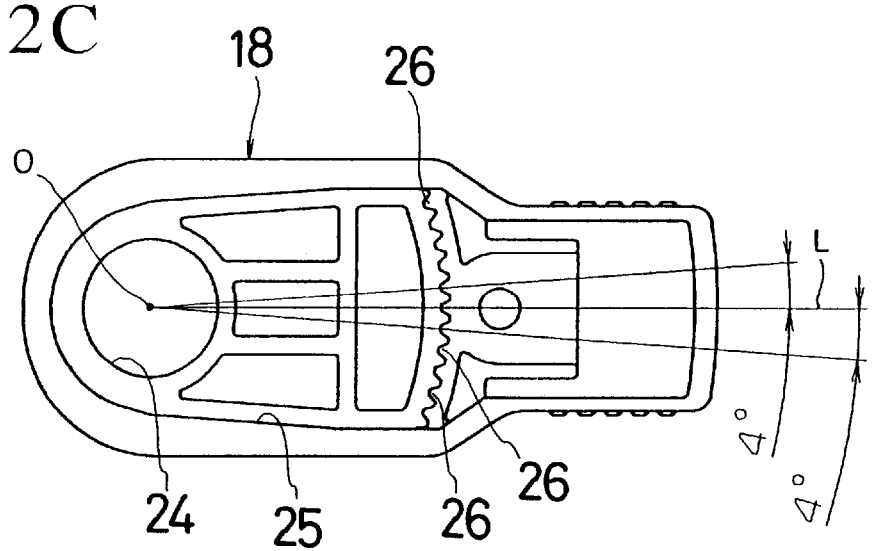

Fitted around the hexagonal head bolt 11 is a manually-operated bolt-tightening lever 15 which includes an inner plate 16, a lock plate 17 which functions as an inner lever, and an outer portion 18 which functions as an outer lever. As also shown in FIGS. 2A, 2B, and 2C, the inner plate 16 has a circular portion 19 for being rotatably and orthogonally fitted around the hexagonal head bolt 11 between the sleeve 13 and the head 14 of the bolt 11. The inner plate 16 additionally includes a base plate 20 which has an elongated slot 21 therein and extends rearward from the circular portion 19. The lock plate 17 has at its front end a socket hole 22 that can fit around the head 14 of the hexagonal head bolt 11 and has a serrated edge with twelve continuous notches, each notch having an angle of 120 degree. The lock plate 17 has at its rear end four engaging teeth 23 formed at intervals of four degrees about the axis O of the hexagonal head bolt, 11. The shape of the outer portion 18 is such that it can cover the inner plate 16 and the lock plate 17 when assembled. Moreover, the outer portion 18 has at its top side a circular hole 24 in which the head 14 of the bolt 11 can be fitted. The outer portion 18 includes also at its top side a compensation recess 25 in which the lock plate 17 is set and pivots sixteen degrees in either direction about the axis O from the position in which the lock plate 17 is aligned with the outer portion 18. Formed at the rear end of the compensation recess 25 are a plurality of compensation teeth 26 that can mesh with the engaging teeth 23 of the lock plate 17 within the ±16 degree pivotal range of the lock plate 17. The compensation teeth 26 span the 32 degree range in which the lock plate 17 pivots in the outer portion 18. As shown in FIGS. 1 and 5, the outer portion 18 contains a fixed nut 27 into which a screw 28 can be tightened through the elongated slot 21 of the inner plate 16 and a washer 29.

Figure 3:
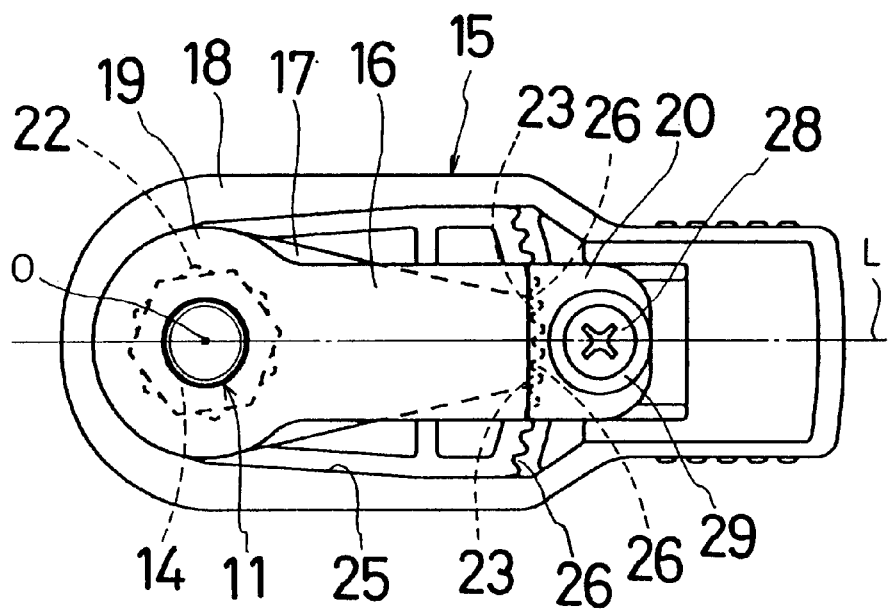
FIG. 3 is a plan view of the bolt-tightening lever seen from the housing of the reciprocating saw.

To assemble the bolt-tightening lever 15 to the reciprocating saw 1, first, the lever accommodating recess 10 is oriented upward. Next, after the inner plate 16 is fitted around the hexagon head bolt 11, the bolt is screwed into the main housing 2. As shown in FIG. 3, once the slide shaft 7 is completely secured by the hexagon head bolt 11, the lock plate 17 is placed in alignment with a center line L, which is parallel with the slide shaft 7, with the socket hole 22 fitted over the head 14 of the bolt 11. When the outer portion 18 is placed on the inner plate 16 over the lock plate 17 in alignment with the center line L and with the circular hole 24 fitting over the head 14, the engaging teeth 23 mesh with the compensation teeth 26, thereby connecting the outer portion 18 with the lock plate 17. The maximum rotational deviation of the outer portion 18 from the center line L is ±4 degrees.

Figure 4:
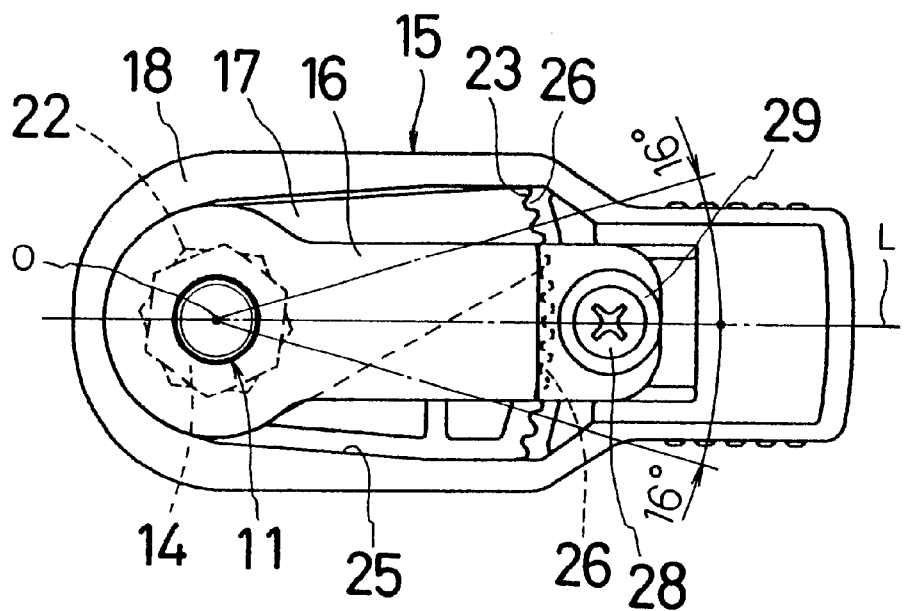
FIG. 4 is a plan view of the bolt-tightening lever similar to FIG. 3, with the inner plate rotated sixteen degrees upward from the position shown in FIG. 3.

As shown in FIG. 4, if the orientation of the lock plate 17 greatly deviates from the center line L due to change in the angle of the head 14 of the hexagon head bolt 11 as the bolt is tightened, the arrangement of the twelve notches on the inner edge of the socket hole 22 allows the pivotal position of the lock plate 17 to be adjusted in increments of 30 degrees or in units of 30 degrees. Moreover, the compensation teeth 26 are arranged so as to mesh with the engaging teeth 23 of the lock plate 17 within the ±16 degree range about the center line O. Therefore, the engaging teeth 23 can be always in mesh with the compensation teeth 26 as the teeth 26 permit a maximum rotational divergence of ±16 degrees of the lock plate 17. In this way, any deviation of the lock plate 17 from the center line L does not obstruct the assembly of the outer portion 18.

When the screw 28 is tightened into the nut 27 fixed in the outer portion 18, the assembly of the bolt-tightening lever 15, which comprises the inner plate 16, the lock plate 17, and the outer portion 18, is completed. Referring to FIG. 5, when the outer portion 18 is pivoted outward in the direction indicated by arrow a, the lock plate 17, connected to the outer portion by the engagement of the engaging teeth 23 with the compensation teeth 26, is also pivoted. This in turn rotates the hexagon head bolt 11 by means of the socket hole 22 so as to release the slide shaft 7, thus allowing repositioning of the guide shoe 6. After the guide shoe 6 is slid to a desired position, the outer portion 18 is pivoted in the opposite direction so as to retighten the hexagon head bolt 11 and secure the slide shaft 7 to the housing 2, thus setting the guide shoe 6 in the desired position.

According to the foregoing embodiment, the bolt-tightening lever 15 includes two separate components, the outer portion 18 and the lock plate 17, the rotational divergence of which from the center line O that may occur in tightening the bolt 11 can be compensated for by the engaging teeth 23 and the compensation teeth 26. This structure allows the outer portion 18 to be substantially aligned with the center line O, regardless of the rotational position of the head 14 when the hexagon head bolt 11 is tightened into the main housing 2, simplifying this otherwise troublesome and time-consuming task. In this way, when the hexagon head bolt 11 is tightened, the bolt-tightening lever 15 always fits in the accommodating recess 10 without protruding from the main housing 2, thus allowing the operator to securely grip the housing 2.

According to the foregoing embodiment, the divergence of the lock plate 17 can be compensated for, as the lock plate 17 is connected to the hexagon head bolt 11 by means of the serrated edge of the socket hole 22. Furthermore, the combination of the engaging teeth 23 and the compensation teeth 26 realizes a convenient means of connecting the components 17 and 18 which further compensates for any misalignment of the pivotal positions of the two components.

It will be appreciated that the numbers and/or the configuration of the engaging teeth 23 of the component 17 and the compensation teeth 26 of the outer portion 18 can be changed to suit various applications without departing from the scope of the invention. For example, the pivotal angle unit of four degrees and/or the angle of the corners of the bolt head and the angle of the notches of the socket hole 22 can be also changed. Although in this embodiment the inner plate 16 is required for setting the lock plate 18 and connecting the lock plate 17 with the outer portion 18 during assembly of the bolt-tightening lever 15, the inner plate can be omitted if other means of securing the lock plate 17 to the outer portion 18 is provided.

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A cutting tool, comprising:
   a housing;
   a guide member slidably attached to the housing;
   a screw member having an axis for securing the guide member in a desired position, the screw member being a bolt having a head;
   a screw-tightening lever for rotating the screw member to secure the guide member; and
   a receiving portion for accommodating the screw-tightening lever at a rotational position of the screw member where the screw member secures the guide member, wherein the screw-tightening lever includes an internal lever which is connected to the screw member so as to be adjustable relative to the screw member so that the screw member is able to secure the guide member in the desired position, and an outer lever attached to the screw member so as to pivot with the screw member on the axis of the screw member, the screw tightening lever further including a coupling means for connecting the internal lever to the outer lever in the receiving portion within a predetermined range of deviation from a predetermined position so that the outer lever remains within a predetermined range of positions within the receiving portion at said rotational position of the screw member;
   wherein the internal lever is connected to the bolt by fitting the head of the bolt into a polygonal socket hole formed in the internal lever so that the internal lever is pivotal on the bolt head and the pivotal position of the internal lever with respect to the bolt head is changeable by a plurality of predetermined units of angle corresponding to the angle of the corners of the polygonal socket hole, and further wherein the coupling means of the screw-tightening lever comprises a plurality of compensation teeth formed on the outer lever and a plurality of engaging teeth formed on the internal lever so as to engage the compensation teeth within a range of pivotal positions no less than the predetermined unit of pivotal angle of the internal lever with respect to the bolt head.

2. A cutting tool in accordance with claim 1, wherein the internal lever is shaped substantially symmetrically about a longitudinal center line which extends substantially parallel to the guide member, the outer lever is shaped substantially symmetrically about a longitudinal center line which extends substantially parallel to the guide member, and the two center lines pass through the axis of the screw member, and further wherein the deviation of the internal lever from the predetermined position is caused by pivoting of the longitudinal center line of the internal lever from that of the outer lever.

3. A cutting tool in accordance with claim 2, wherein the bolt is a hexagonal head bolt and the angle of each corner of the polygonal hole in the internal lever is approximately 120 degrees, so that the predetermined unit of pivotal angle is approximately 30 degrees, and further wherein the compensation teeth and the engaging teeth are located along a common circumference with the axis of the hexagonal head bolt as the center and the internal lever is formed with four engaging teeth at intervals of four degrees around the axis of the hexagonal head bolt, thus spanning a sixteen degree range, with the center line of the inner lever symmetrically dividing the four engaging teeth into two on each side of the line, and the compensation teeth are formed at intervals of four degrees around the axis of the hexagonal head bolt, with the center line of the outer lever symmetrically dividing the compensation teeth into approximately equal numbers of teeth on either side of the line, so as to allow the internal lever to have plurality of pivotal positions of at least a 30 degree range.

4. A cutting tool in accordance with claim 3, wherein the screw-tightening lever further includes a means for maintaining engagement between the internal lever and the outer lever.

5. A cutting tool in accordance with claim 4, wherein the means for maintaining engagement includes:
   a connection plate which has a circular hole at a first end thereof for being fitted around the hexagonal head bolt and a slot at a second end thereof; and
   a screw means for being tightened into the outer lever through the slot of the connection plate, with the internal lever interposed between the outer lever and the connection plate.

6. A cutting tool in accordance with claim 5, wherein the receiving portion is a recess provided in the housing of the tool and configured so that the screw-tightening lever is located in an unobstructive position for manual handling when accommodating the screw-tightening lever.

7. A cutting tool in accordance with claim 6, wherein the outer lever further includes a recess for accommodating the head of the hexagonal head bolt, the inner lever, and the means for maintaining engagement.

8. A cutting tool in accordance with claim 7, wherein the guide member is a guide shoe which includes a shaft portion having a first end slidably inserted in the housing and a second end protruding from a front end of the housing, and a plate portion attached to the second end of the shaft portion for being pressed against workpieces.

9. A cutting tool in accordance with claim 1, wherein the guide member further includes a slot formed in the shaft portion, wherein the screw member is tightened into the housing via the slot so as to secure the guide member in a desired position along the slot with respect to the housing.

10. A cutting tool in accordance with claim 2, wherein the guide member further includes a slot formed in the shaft portion, wherein the screw member is tightened into the housing via the slot so as to secure the guide member in a desired position along the slot with respect to the housing.

11. A cutting tool in accordance with claim 3, wherein the guide member further includes a slot formed in the shaft portion, wherein the screw member is tightened into the housing via the slot so as to secure the guide member in a desired position along the slot with respect to the housing.

12. A cutting tool in accordance with claim 4, wherein the guide member further includes a slot formed in the shaft portion, wherein the screw member is tightened into the housing via the slot so as to secure the guide member in a desired position along the slot with respect to the housing.

13. A cutting tool in accordance with claim 5, wherein the guide member further includes a slot formed in the shaft portion, wherein the screw member is tightened into the housing via the slot so as to secure the guide member in a desired position along the slot with respect to the housing.

14. A cutting tool in accordance with claim 6, wherein the guide member further includes a slot formed in the shaft portion, wherein the screw member is tightened into the housing via the slot so as to secure the guide member in a desired position along the slot with respect to the housing.

15. A cutting tool in accordance with claim 7, wherein the guide member further includes a slot formed in the shaft portion, wherein the screw member is tightened into the housing via the slot so as to secure the guide member in a desired position along the slot with respect to the housing.

16. A cutting tool in accordance with claim 8, wherein the guide member further includes a slot formed in the shaft portion, wherein the screw member is tightened into the housing via the slot so as to secure the guide member in a desired position along the slot with respect to the housing.

17. A saw, comprising:
   a housing;
   a guide slidably attached to the housing;
   a screw having an axis for securing the guide in a desired position;
   a screw-tightening lever for rotating the screw to secure the guide, the screw-tightening lever including an internal lever and an outer lever coupled to the screw so as to pivot with the screw on the axis of the screw, the internal lever having a plurality of compensation teeth for engaging a plurality of compensation teeth formed on the outer lever to maintain the outer lever within a predetermined range of positions after rotation of the screw to secure the guide in the desired position.

* * * * *